United States Patent [19]

Scheibal

[11] 4,192,905

[45] Mar. 11, 1980

[54] IMITATION BEVEL EDGING

[76] Inventor: Thomas P. Scheibal, 407 Francisco St., San Francisco, Calif. 94133

[21] Appl. No.: 822,314

[22] Filed: Aug. 5, 1977

[51] Int. Cl.$^2$ ........................ B29D 11/00; B32B 7/12; B32B 17/10

[52] U.S. Cl. ........................................ 428/80; 52/311; 52/812; 52/827; 428/14; 428/40; 428/81; 428/119; 428/192; 428/209; 428/339; 428/397

[58] Field of Search ..................... 428/397, 80, 14, 81, 428/119, 192, 209, 339; 52/208, 311, 812, 827

[56] References Cited

U.S. PATENT DOCUMENTS 3,869,106 3/1975 Gregor ................................ 428/397

FOREIGN PATENT DOCUMENTS 1162171 9/1958 France .................................... 428/397

*Primary Examiner*—J. C. Cannon

[57] ABSTRACT

A strip of material of wedge-shaped cross-section adherable to the edges of a pane of glass or plastic or a mirror to produce a bevel-edge appearance. Two principal forms are shown, one formed of transparent plastic for producing the effect on windows and the like, and one formed with a metallized reflective coating for use on mirrors.

18 Claims, 5 Drawing Figures

IMITATION BEVEL EDGING

BACKGROUND OF THE INVENTION

This invention relates to IMITATION BEVEL EDGING, and more particularly to a plastic strip of wedge or trapezoidal cross-section for adhering to transparent or reflective sheet of material of glass or polymeric plastic, such as windows or mirrors.

The production of genuine beveled-egde mirrors and glass panes has become almost prohibitively expensive, as a result of the substantial labor required. Moreover, the production of such edges on curved surfaces has been essentially out of the question, except for rare works of high artistic value. Accordingly, an inexpensive and yet reasonably effective process for imitating the effect would be highly desirable.

SUMMARY OF THE INVENTION

The imitation bevel edging of the present invention provides a material and a technique for making an aesthetically pleasing bevel-edging effect without the labor involved in actual beveling. The plastic strip material is inexpensively produced, cut to size if necessary, has its ends mitered, and is adhered either to the glass or plastic pane itself or to a frame surrounding the pane. The technique is applicable to both transparent sheets such as windows, and to reflective sheets such as mirrors. For use with mirrors, the plastic strip may be coated with a reflective material selected to imitate the reflectivity of the mirror.

Since the technique uses an applied strip or ring of material and since the material of the strip is plastic, it is feasible to apply a bevel-edge effect to curved surface sheets, such as bay windows. It is also feasible to form the strip as a closed annular body dimensioned to fit the periphery of a round, oval or even irregularly-shaped sheet.

Accordingly, it is a principal object of the present invention to provide an imitation bevel edging of the character described which produces an aesthetically acceptable bevel-edge effect.

It is a further principal object of the present invention to provide a method for producing an imitation bevel-edge effect which is simple, inexpensive and not labor-intensive.

Yet another object of the present invention is to provide an imitation bevel-edging material which may be readily applied to curved surfaces and surfaces having curved peripheries.

A still further object of the present invention is to provide an imitation bevel-edging material capable of being invisibly adhered to the surface of the sheet material on which the effect is produced.

Further objects and advantages of the invention will become apparent as the specification progresses, and the new and useful features of the imitation bevel edging will be more fully defined in the claims attached hereto.

BRIEF DESCRIPTION OF THE DRAWINGS

The preferred forms of the present invention are illustrated in the accompanying drawings, forming part of this specification, in which.

While only the preferred form of the invention has been shown here, it should be appreciated that various changes or modifications may be made within the scope of the claims attached hereto without departing from the spirit of the invention.

DESCRIPTION OF THE PREFERRED EMBODIMENTS

Figure 1:
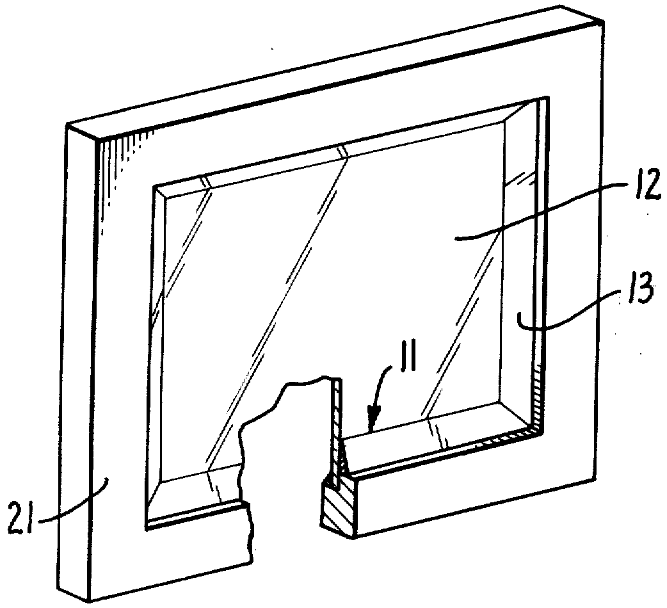
FIG. 1 is a perspective view of the application of the imitation bevel edging of the present invention to a window, with a small portion broken away to show the cross-section.
Figure 2:
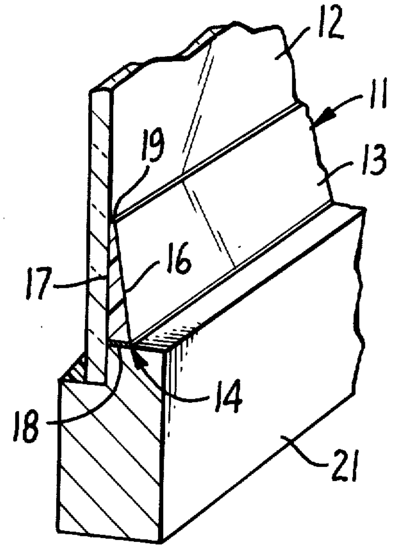
FIG. 2 is an enlarged cross-section and perspective view of the area generally enclosed by the arrows 2—2 of FIG. 1.
Figure 3:
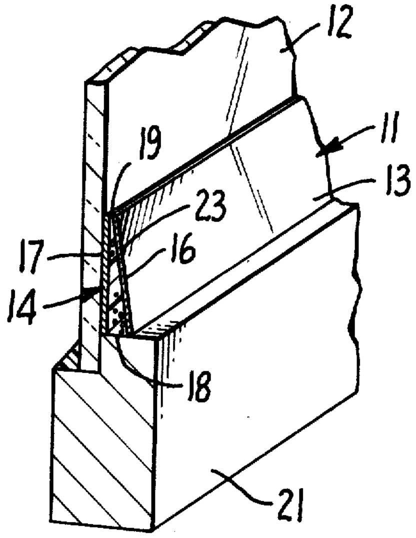
FIG. 3 is a cross-sectional and perspective view corresponding in location to that of FIG. 2 and showing a modified form of the invention suitable for mirrors.

Referring to the drawings in detail, it will be seen that the imitation bevel edging 11 of the present invention is intended to be applied to the surface of a sheet body 12, such as a pane of glass or a mirror. The edging 11 is formed as a linearly extending body on strip 13 having a wedge-shaped or shallow trapezoidal cross-section, as can be seen in FIGS. 2 and 3. Adhesion means 14 such as glue or double-faced adhesive tape affixes the strip 13 to the completed assembly with the "butt" or thick edge of the strip 13 toward the periphery of the sheet 12.

The linearly extending body or strip 13 has two relatively extensive faces whose edges are shown at 16 and 17 in FIGS. 2 and 3. The faces 16 and 17 are disposed at a shallow angle to each other and generally transverse to the linear extent of the strip 13. The strip 13 also has relatively narrow (in comparison to faces 16 and 17) edge faces whose edges are shown at 18 and 19 in FIGS. 2 and 3, disposed at large angles with respect to the faces 16 and 17 and transverse to the linear extent of the body 13. The first of the edge faces 18 is relatively wider than the second edge face 19, so that it forms the "butt" or thicker end of the wedge. This thicker edge face 18 is the face of the strip disposed outwardly, that is, toward the periphery of the sheet 12.

In the form of the invention shown in FIG. 2, the linearly extending body or strip 13 is formed of transparent polymeric material such as Lexan, Lucite, or Taffak. In this form, the adhesion means 14 is applied between the butt face 18 and the adjacent portion of a frame 21 surrounding the sheet body 12. The frame means 21 has a portion 22 extending perpendicularly above or upstanding from the sheet body 12, so that the edge face 18 of the strip 13 can be brought into contact with the frame 21 to be secured to it. This form, with the strip 13 being transparent, is particularly suited to window use, although it may be applied to mirrors as well.

In the form of the invention shown in FIG. 3, the sheet body 12 is a mirror and the exposed relatively extensive face 16 of the strip 13 is provided with a metallically reflective coating 23. The reflectivity of the coating 23 is selected to approximate that of the mirror formed by the sheet body 12. In this form of the invention, the strip need not be formed of transparent plastic, and may conveniently be formed of other non-transparent plastic materials, such as plastic foam.

FIG. 3 also shows a variation in the form of the inner edge face 19, so that it forms a slight chamfer at the inner edge of the strip 13 by being disposed less acutely to the outer face 16 and more acutely to the inner face 17 of the strip. This variation may also be applied to the transparent form of FIG. 2. When used with a reflective coating as in FIG. 3, however, the inner edge face 19 should have a reflective coating similar to the coating 23 applied to the outer face 16. Since the strip 13 is not transparent in the form of FIG. 3, it can be conveniently adhered to the sheet body 12 by its inner face 17, rather than its butt edge face 18 being adhered to the frame 21. It may, however, be adhered to the frame 21 by the face 18 instead of to the sheet 12 by the face 17 if so desired.

The cross-section of the strip 13 in both the FIG. 2 and the FIG. 3 forms could as well be described as generally trapezoidal or quadrilateral, with the two coverging faces of the trapezoid being regarded as the two relatively extensive faces 16 and 17 of the strip 13, disposed at a shallow angle to each other. In another sense, the invention herein may be regarded as the completed product, a planar sheet 12 of material having a periphery, with the strip 13 of plastic material of a wedge-shaped cross-section as described above affixed adjacent the periphery of the planar sheet 12, with one of the faces 16 and 17 parallel to the surface of the planar sheet 12.

For best results, the butt edge face 18 should be generally perpendicular to the inner extensive face 17. The presently preferred adhesion means 14 is an adhesive tape No. 4432 made by Minnesota Mining and Manufacturing Co. A broad range of plastics are suitable for the strip 13, but for the transparent version acrylic plastic is presently preferred because of superior optical qualities. The strip 13 may be molded as a unit, or extruded, and may be mechanically or chemically polished to provide the desired optical characteristics.

Figure 4:
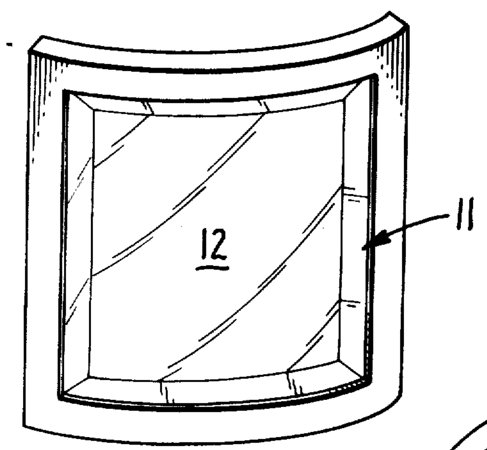
FIG. 4 is a perspective view on a reduced scale of the edging of the invention applied to a curved surface.
Figure 5:
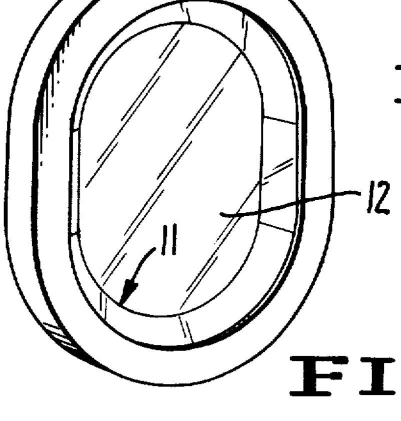
FIG. 5 is an elevational view of the application of the edging to a surface of curved periphery such as an oval mirror.

FIG. 4 shows the material of the present invention as applied to a curved sheet surface 12, such as a curved bay window. This produces a very substantial labor saving over hand grinding techinques for beveling such a curved sheet of glass. FIG. 5 shows the imitation bevel edging 11 applied to a surface of curved periphery, such as an oval mirror or window. For this purpose, the strip material would be molded in the curved shape, rather than being extruded.

Generally speaking, the inner edge 19 should be quite thin so that the double line visible to the onlooker thereat closely simulates the apparent double line produced by actual beveling of the glass. It has been found that a height of 1/32 inch on the inner edge 19 and about ⅛ inch on the outer edge 18 of a one inch wide strip produces a realistic and pleasing appearance.

Although the actual bevel produced is opposite in angle to the bevel of truly beveled glass, the effect produced is quite similar, and close inspection is required to distinguish the imitation from the genuine bevel. There is, however, a marked difference in the labor required to produce the effect, greatly favoring the imitation beveling effect of this application. The beveling effect produced is aesthetically pleasing and inexpensive, and adaptable with relative ease and substantial cost advantage to curved surfaces and curved edges. The adhering is essentially invisible from normal viewing distance, and the plastic strip appears to be an integral part of the mirror.

What is claimed is:

1. A simulated bevel edge for the surface of a sheet body and the like, comprising:
  - a transparent elongated strip of polymeric material having a surface adapted for mounting on a sheet body adjacent the periphery of a designated area thereof, and adhesion means for securing said strip in place,
  - said strip having an opposite surface disposed at an acute angle to said first named surface,
  - whereby incident or transmitted light is reflected or refracted in such manner that the area of said sheet body covered by said strip appears to be beveled with respect to the inward adjacent area of said sheet body.

2. A simulated bevel edge as claimed in claim 1, and wherein said sheet body is provided with frame means formed with a portion extending from the surface of said sheet body, and the thicker edge of said strip is adapted for attachment to said portion of said frame by said adhesion means.

3. A simulated bevel edge as claimed in claim 1, and wherein said sheet body is a mirror.

4. A simulated bevel edge as claimed in claim 3, and wherein said opposite surface of said strip is reflective to a degree approximating the reflectivity of said mirror.

5. A simulated bevel edge as claimed in claim 4, and wherein said first named surface of said strip is adhered to the mirror.

6. A simulated bevel edge as claimed in claim 1, and wherein cross sections taken through said strip at substantially any location therealong are of substantially similar profile having a periphery comprising a first line lying in said first named surface, and a second line lying in said second named surface at an acute angle to said first line.

7. A simulated bevel edge as claimed in claim 6, and wherein said profile is of thin trapezoidal form with the converging lines thereof being formed by said first named and opposite surfaces disposed at a shallow acute angle to each other.

8. A simulated bevel edge as claimed in claim 7, and wherein height of the thinner end of said trapezoid is about one thirty-secondth, and the height of the thicker end of said trapezoid is about one-eighth, of the width of said strip.

9. A simulated bevel edge as claimed in claim 8, and wherein the width of said strip is about one inch.

10. A simulated bevel edge as claimed in claim 6, and wherein at least a portion of said strip is curved so as to conform to a corresponding curvature of said periphery of said designated area of the sheet body.

11. A transparent sheet having a simulated bevel edge, comprising
  - a sheet of transparent material,
  - a transparent elongated strip of polymeric material having a first surface mounted on said sheet along the periphery of a designated area thereof, and
  - adhesion means securing said strip in place,
  - said strip having a second surface opposite to said first surface disposed at an acute angle thereto whereby incident or transmitted light is reflected or refracted in such manner that the area of said sheet covered by said strip appears to be beveled with respect to the inward adjacent area of said sheet.

12. An article as described in claim 11, and wherein said sheet is of glass, and said adhesion means is not visible under normal lighting conditions.

13. An article as described in claim 11 wherein said sheet is provided with frame means formed with a portion extending from the surface of said sheet and the thicker edge of said strip is adapted for attachment to said portion of said frame by said adhesion means.

14. An article as described in claim 11, and wherein cross sections taken on planes perpendicularly transverse to said strip at substantially any location therealong are of substantially similar profile having a periphery comprising a first line lying in said first surface and a second line lying in said second surface at an acute angle to said first line.

15. An article as described in claim 14, and wherein at least a portion of said designated area is curved, and the corresponding portion of said strip is similarly curved.

16. An article as described in claim 14, and wherein said profile is of thin trapezoidal form with the converging lines thereof being formed by said first and second surfaces disposed at a shallow acute angle to each other.

17. An article as described in claim 16, and wherein the height of the thinner end of said trapezoid is about one-thirty-second of the width of said strip, and the height of the thicker end of said trapezoid is about one-eighth of the width of said strip.

18. An article as described in claim 17, and wherein the width of said strip is about one inch.

* * * * *